United States Patent
Kouchmeshky et al.

(10) Patent No.: US 9,910,182 B2
(45) Date of Patent: Mar. 6, 2018

(54) METHOD AND APPARATUS FOR INVERSION IN DIELECTRIC LOGGING

(71) Applicants: Babak Kouchmeshky, Kingswood, TX (US); Rashid W. Khokhar, Sugar Land, TX (US); Hans-Martin Maurer, Houston, TX (US); Wallace H. Meyer, Spring, TX (US)

(72) Inventors: Babak Kouchmeshky, Kingswood, TX (US); Rashid W. Khokhar, Sugar Land, TX (US); Hans-Martin Maurer, Houston, TX (US); Wallace H. Meyer, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 828 days.

(21) Appl. No.: 14/322,482

(22) Filed: Jul. 2, 2014

(65) Prior Publication Data
US 2016/0003963 A1     Jan. 7, 2016

(51) Int. Cl.
*G01V 3/38* (2006.01)
*E21B 47/12* (2012.01)
(Continued)

(52) U.S. Cl.
CPC . *G01V 3/38* (2013.01); *G01V 3/20* (2013.01)

(58) Field of Classification Search
CPC ......... G01V 3/18–3/40; E21B 47/00–47/1025; H04Q 9/12
(Continued)

(56) References Cited

U.S. PATENT DOCUMENTS

| 6,414,492 B1 | 7/2002 | Meyer et al. |
| 7,363,160 B2 | 4/2008 | Seleznev et al. |

(Continued)

FOREIGN PATENT DOCUMENTS

| EP | 0704717 A2 | 4/1996 |
| EP | 1693685 A1 | 8/2006 |
| WO | 1995024663 A1 | 9/1995 |

OTHER PUBLICATIONS

Carmona, et al. "Zapping Rocks", Oilfield Review, Spring 2011, No. 1, pp. 39-52.
(Continued)

*Primary Examiner* — Melissa Koval
*Assistant Examiner* — Rahul Maini
(74) *Attorney, Agent, or Firm* — Cantor Colburn LLP

(57) ABSTRACT

A method for inverting dielectric logging tool measurement data to estimate an electrical characteristic of an earth formation includes: receiving measurement data from the logging tool having a transmitter antenna and receiver antennas spaced known distances from the transmitter antenna; establishing an equation relating magnetic field measurements made by the receiver antennas to the distances and a wave vector; establishing an error equation that quantifies a difference between the magnetic field measurements made by the receiver antennas to magnetic field measurements made by the receiver antennas that would be obtained with an estimated formation electrical characteristic; calculating an error using the error equation for an initial estimated value of the wave vector that comprises a term having a first number multiplied times a second number of radians to provide a plurality of calculated errors; and determining a minimum error from the plurality of calculated errors to estimate the electrical characteristic.

18 Claims, 8 Drawing Sheets

(51) Int. Cl.
  *E21B 49/00* (2006.01)
  *G01V 3/34* (2006.01)
  *G01V 3/20* (2006.01)

(58) Field of Classification Search
  USPC .................. 324/303, 323–375; 702/6–13
  See application file for complete search history.

(56) References Cited

U.S. PATENT DOCUMENTS

| | | |
|---|---|---|
| 2003/0004646 A1 | 1/2003 | Haugland |
| 2005/0075789 A1 | 4/2005 | Xiao et al. |
| 2016/0131791 A1* | 5/2016 | Wu .......................... G01V 3/38 702/7 |

OTHER PUBLICATIONS

International Search Report and the Written Opinion of the International Searching Authority; PCT/US2015/036861; Korean Intellectual Property Office; dated Sep. 15, 2015; 8 pages.

\* cited by examiner

| Low Resistivity | | | | | | |
|---|---|---|---|---|---|---|
| Transmitter<br>Receivers<br>Distance [in] | Tr1<br>Rc1Rc4<br>3 & 6 | Tr1<br>Rc2Rc3<br>4 & 5 | Tr2<br>Rc1Rc4<br>6 & 9 | Tr2<br>Rc2Rc3<br>7 & 8 | Tr3<br>Rc1Rc4<br>9 & 12 | Tr3<br>Rc2Rc3<br>10 & 11 |
| Frequency [MHz] | Relative magnitude [dB] | | | | | |
| 20 | −24 | −7.8 | −18 | −6 | −16 | −5.2 |
| 63 | −32 | −10.4 | −26 | −8.6 | −23.5 | −8 |
| 200 | −44 | −14.5 | −38 | −12.8 | −37 | −12.1 |
| 450 | −57 | −18.5 | −51 | −17 | −48 | −16.2 |
| 1000 | −67 | −22 | −62 | −20.5 | −60 | −20 |

FIG.5A

| Low Resistivity | | | | | | |
|---|---|---|---|---|---|---|
| Transmitter<br>Receivers<br>Distance [in] | Tr1<br>Rc1Rc4<br>3 & 6 | Tr1<br>Rc2Rc3<br>4 & 5 | Tr2<br>Rc1Rc4<br>6 & 9 | Tr2<br>Rc2Rc3<br>7 & 8 | Tr3<br>Rc1Rc4<br>9 & 12 | Tr3<br>Rc2Rc3<br>10 & 11 |
| Frequency [MHz] | Relative magnitude [dB] | | | | | |
| 20 | 65 | 22 | 69 | 23 | 70 | 23 |
| 63 | 122 | 42 | 125 | 42 | 125 | 43 |
| 200 | 240 | 79 | 240 | 80 | 240 | 80 |
| 450 | 380 | 130 | 390 | 130 | 390 | 130 |
| 1000 | 690 | 230 | 690 | 230 | 690 | 230 |

Phase Wrapping

FIG.5B

METHOD AND APPARATUS FOR INVERSION IN DIELECTRIC LOGGING

BACKGROUND

Earth formations may be used for various purposes such as hydrocarbon production, geothermal production, and carbon dioxide sequestration. In order to efficiently use the earth formation, the formation is characterized by performing measurements of many different properties using one or more tools conveyed through a borehole penetrating the formation. One category of tools includes tools that measure electrical characteristics of the earth formation such as conductivity and dielectric constant or permittivity. These tools transmit an electrical signal into the formation and receive a return electrical signal from the formation. The return signal is modified from the transmitted signal in accordance with the electrical characteristics of the formation.

An inversion process is applied to measured values of the return signal to estimate an electrical property of the earth formation. The inversion process estimates an electrical characteristic of the formation that would result in modifying the transmitted signal to provide the return signal having the same measured values. Unfortunately, conventional inversion processes may not provide accurate estimates of formation properties. Hence, an inversion process that provides a more accurate estimate of formation properties would be appreciated by the drilling industry.

BRIEF SUMMARY

Disclosed is a method for inverting measurement data obtained from a dielectric logging tool to estimate an electrical characteristic representative of an earth formation penetrated by a borehole. The method includes: receiving, using a processor, measurement data from a dielectric logging tool disposed in the borehole and comprising a transmitter antenna, a first receiver antenna spaced a first distance from the transmitter antenna, and a second receiver antenna spaced a second distance from the transmitter antenna; establishing, using the processor, an equation relating magnetic field measurements made by the first antenna and the second antenna to the first distance, the second distance, and a wave vector, the wave vector being a function of formation permeability, formation permittivity, formation conductivity, and angular frequency of an electromagnetic wave transmitted by the transmitter antenna; establishing, using the processor, an error equation that quantifies a difference between the magnetic field measurements made by the first antenna and the second antenna to magnetic field measurements made by the first antenna and the second antenna that would be obtained with an estimated formation electrical characteristic; calculating an error using the error equation for an initial estimated value of the wave vector that includes a term having a first number multiplied times a second number of radians for a plurality of first numbers to provide a plurality of calculated errors using the processor; and determining a minimum error from the plurality of calculated errors and identifying the associated estimated formation electrical characteristic in the error equation having the minimum error as the electrical characteristic representative of the earth formation using the processor.

Also disclosed is a method for estimating a property of an earth formation. The method includes: conveying a carrier through a borehole penetrating an earth formation; transmitting an electromagnetic wave into the earth formation using a transmitter antenna disposed on the carrier; measuring a first magnetic field using a first receiver antenna spaced a first distance from the transmitter antenna, the first magnetic field being due to receiving at the first receiver antenna the transmitted electromagnetic wave as modified by the earth formation; measuring a second magnetic field using a second receiver antenna spaced a second distance from the transmitter antenna, the second magnetic field being due to receiving at the second receiver antenna the transmitted electromagnetic wave as modified by the earth formation; establishing, using a processor, an equation relating a ratio of the first magnetic field to the second magnetic field to the first distance, the second distance, and a wave vector, the wave vector being a function of formation permeability, formation permittivity, formation conductivity, and angular frequency of an electromagnetic wave transmitted by the transmitter antenna; establishing, using the processor, an error equation that quantifies a difference between the ratio of the first and second magnetic fields as measured to a ratio of the first and second magnetic fields that would be obtained with an estimated formation electrical characteristic; calculating an error using the error equation for an initial estimated value of the wave vector that includes a term having an integer multiplied times two-pi radians for a plurality of integers to provide a plurality of calculated errors using the processor; determining a minimum error from the plurality of errors and the associated estimated formation electrical characteristic in the error equation having the minimum error using the processor; and estimating, using the processor, the formation property using the associated estimated formation electrical characteristic in the error equation having the minimum error.

Further disclosed is an apparatus for estimating an electrical characteristic representative of an earth formation. The apparatus includes: a carrier configured to be conveyed through a borehole penetrating the formation; a transmitter antenna disposed on the carrier and configured to transmit an electromagnetic wave into the formation; a first receiver antenna spaced a first distance from the transmitter and configured to receive the electromagnetic wave from the formation and measure a first magnetic field at the first receiver antenna; a second receiver antenna spaced a second distance from the transmitter and configured to receive the electromagnetic from the formation and measure a second magnetic field at the second receiver antenna; and a processor. The processor is configured to receive the magnetic field measurements obtained at the first and second receiver antennas; establish an equation relating a ratio of the measure first magnetic field to the measured second magnetic field to the first distance, the second distance, and a wave vector, the wave vector being a function of formation permeability, formation permittivity, formation conductivity, and angular frequency of an electromagnetic wave transmitted by the transmitter antenna; establish an error equation that quantifies a difference between the ratio of the first and second magnetic fields as measured to a ratio of the first and second magnetic fields that would be obtained with an estimated formation electrical characteristic; calculate an error using the error equation for an initial estimated value of the wave vector that comprises a term having an integer multiplied times two-pi radians for a plurality of integers to provide a plurality of calculated errors; and determine a minimum error from the plurality of errors and identify the associated estimated formation electrical characteristic in the error equation having the minimum error as the electrical characteristic representative of the earth formation.

BRIEF DESCRIPTION OF THE DRAWINGS

The following descriptions should not be considered limiting in any way. With reference to the accompanying drawings, like elements are numbered alike:

FIGS. 5A and 5B, collectively referred to FIG. 5, presents relative magnetic field measurement data for magnitude and phase, respectively, at a pair of receiver antennas for an associated transmitter antenna;

DETAILED DESCRIPTION

A detailed description of one or more embodiments of the disclosed apparatus and method presented herein by way of exemplification and not limitation with reference to the figures.

Disclosed are method and apparatus for inverting data from a dielectric logging tool to estimate an electrical characteristic of an earth formation such as conductivity and/or permittivity. Once the electrical characteristic has been estimated, then a property of the earth formation, such as water saturation, formation resistivity, textural information of formation, etc. may be determined using the electrical characteristic.

The disclosed dielectric logging tool is based on electromagnetic wave propagation. The tool is configured to transmit an electromagnetic wave into the earth formation and at the same time receive the electromagnetic wave after the wave has traveled through the formation. The electromagnetic wave is altered by electrical characteristics of the formation. By measuring characteristics of the received electromagnetic wave, the electrical characteristics of the formation may be estimated. In one or more embodiments, the absolute values of the amplitude and phase shift may be found by comparison with an accurately known reference signal generated in the tool. In addition, the propagation time of the wave may be calculated for the specific tool geometry from the received wave measurements.

Generally, the frequency of the transmitted electromagnetic wave is in the range of 20 MHz to 1 GHZ although other frequencies outside of this range may also be used. Depending on the frequency selected, geometry of the tool and formation properties, the phase shift of the received electromagnetic wave may exceed $2\pi$ radians in a phenomena referred to as "phase wrapping." Phase wrapping may lead to an inaccurate phase shift measurements because the amount of phase wrapping is unknown. When phase wrapping occurs, prior art inversion methods may provide inaccurate estimates of formation electrical characteristics because the prior art inversion methods may converge on a local error minimum instead of a global error minimum. The method and apparatus disclosed herein overcomes this shortcoming in order to converge on the global error minimum, which provides greater accuracy in estimating the formation electrical characteristics. The algorithm converges within a few steps hence providing a significant advantage over other global minimum approaches in applications where on-site fast estimation of properties is of paramount importance. For example, this can be important for drill string steering applications in measurement-while-drilling (MWD) or logging-while-drilling (LWD) applications, but not limited to them.

Figure 1:
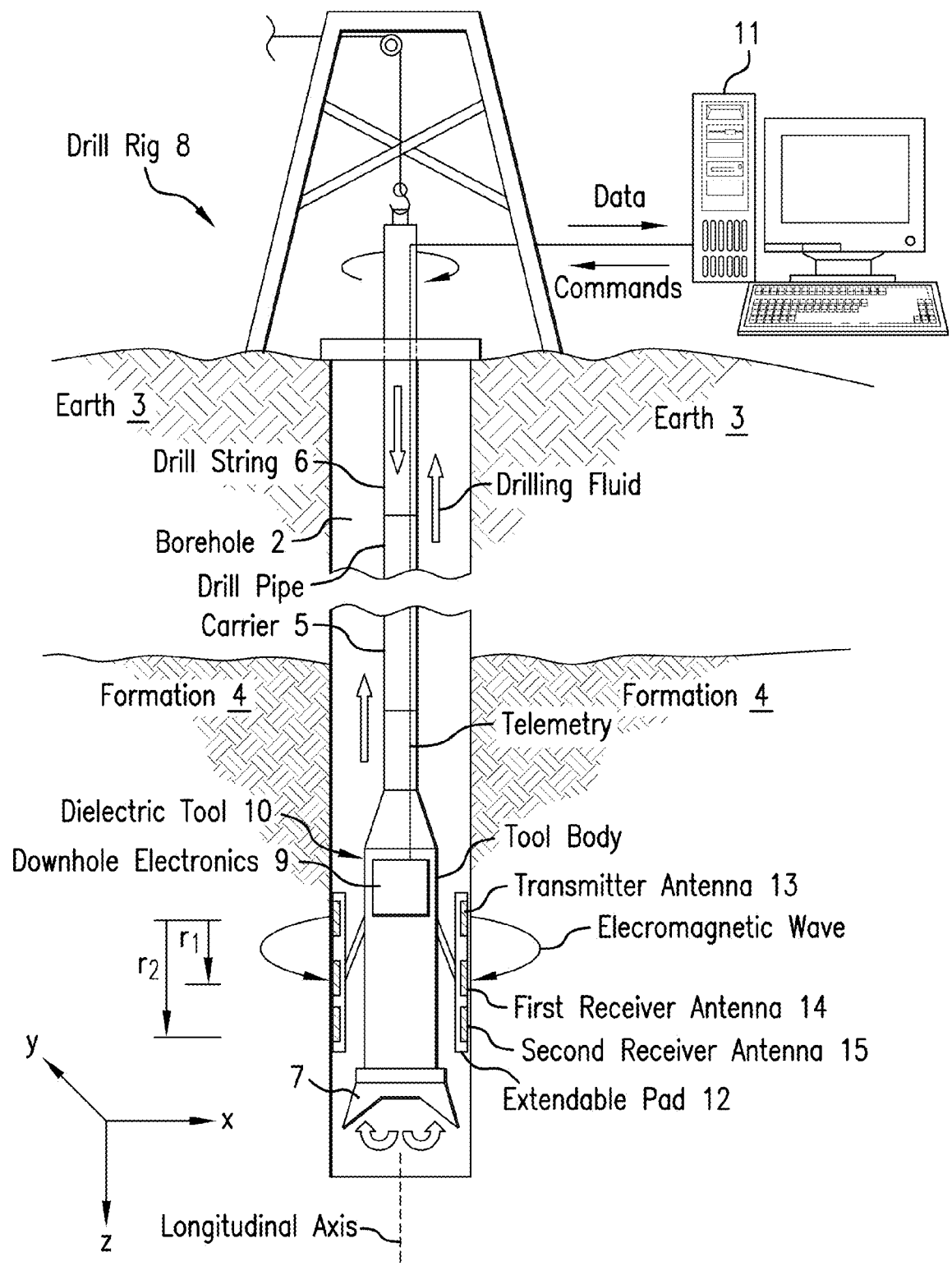
FIG. 1 illustrates a cross-sectional view of an exemplary embodiment of a downhole tool having transmitting and receiving antennas disposed in a borehole penetrating the earth.

Apparatus for implementing one or more embodiments of an inversion method that accommodates phase wrapping is now presented with reference to FIG. 1. FIG. 1 illustrates a cross-sectional view of an exemplary embodiment of a dielectric tool 10 disposed in a borehole 2 penetrating the earth 3, which includes an earth formation 4. The formation 4 represents any subsurface material of interest that may be sensed by the dielectric tool 10. The subsurface material can include an earth formation material which may be in the form of a solid, liquid and/or gas. The dielectric tool 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 9 are configured to operate the dielectric tool 10, process measurement data obtained downhole, and/or act as an interface with telemetry to communicate data or commands between downhole components and a computer processing system 11 disposed at the surface of the earth 3. Non-limiting embodiments of the telemetry include pulsed-mud and wired drill pipe. System operation and data processing operations may be performed by the downhole electronics 9, the computer processing system 11, or a combination thereof. The dielectric tool 10 may be operated continuously or at discrete selected depths in the borehole 2 or may be placed in a stationary in situ embodiment. In an alternative embodiment, the carrier 5 may be an armored wireline, which can also provide communications between the downhole electronics 9 and the processing system 11.

As illustrated in FIG. 1, the dielectric tool 10 includes an extendable pad 12 that is configured to make contact with a borehole wall. Disposed on the pad 12 are a transmitter antenna 13, a first receiver antenna 14 and a second receiver antenna 15. It can be appreciated that FIG. 1 illustrates but one embodiment and that other embodiments may include more than one transmitter antenna and/or one or more receiver antennas. The transmitter antennas may be located symmetrically on both sides of the receiver antennas for compensated measurements or the transmitter antennas may be located in the center of the pad with the receiver antennas being located symmetrically on both sides of the pad. The transmitter antenna 13 is configured to receive an electrical signal from transmitter electronics, which may be included in the downhole electronics 9, and convert the electrical signal into an electromagnetic wave that is transmitted into the formation 4. The electromagnetic wave travels through the formation 4 where the wave is altered, modified or established by the formation 4 in accordance with the formation electrical characteristics. The first receiver antenna 14 is spaced a first distance $r_1$ from the transmitter antenna 13 and the second receiver antenna 15 is spaced a second distance $r_2$ from the transmitter antenna 13. The first receiver antenna 14 and the second receiver antenna 15 are configured to receive the electromagnetic wave that has traveled through the formation 4. The receiver antennas 14 and 15 convert the received electromagnetic wave into an electrical signal that is amplified and/or processed by receiver electronics, which may be included in the downhole electronics 9. In general, the downhole electronics 9 are configured to transmit (or fire) the electromagnetic wave using the transmitter antenna and then receive the return electromagnetic wave using one receiver antenna. Next, the transmitter antenna 13 transmits the electromagnetic wave using the transmitter antenna and then receives the altered electromagnetic wave using the other transmitter antenna. Accordingly, a series of measurements are performed where consecutive measurements are performed using different receiver antennas. Similarly, a series of measurements may be performed using more than one transmitter antenna.

Figure 2:
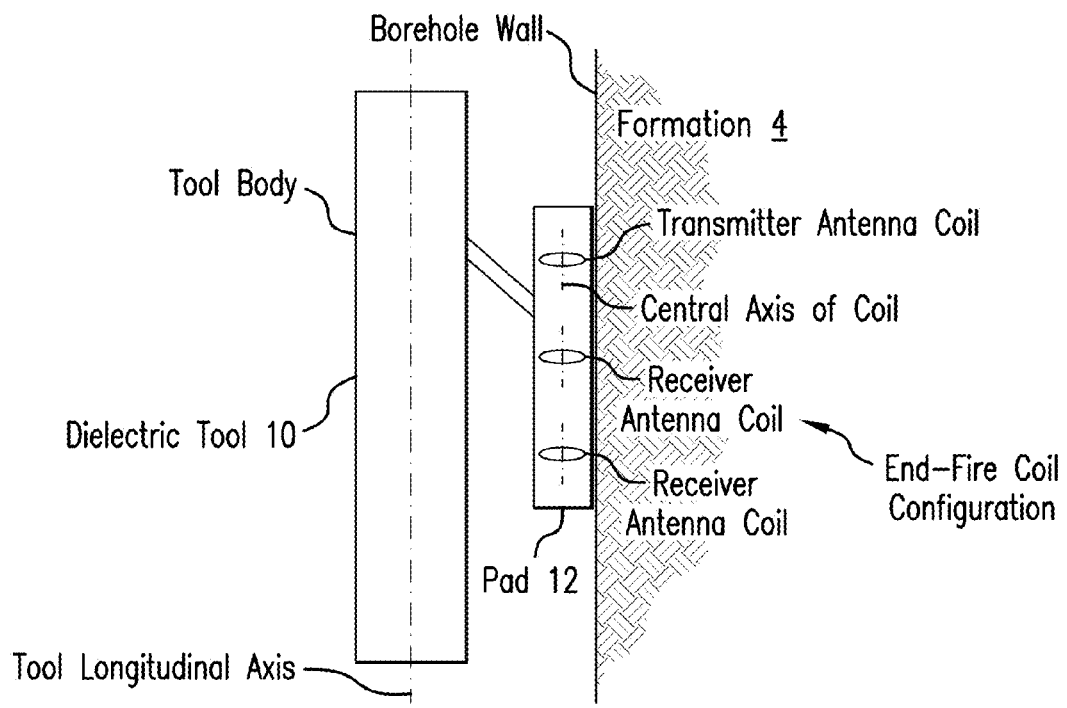
FIG. 2 depicts aspects of the transmitting and receiving antennas configured for end-firing.
Figure 3:
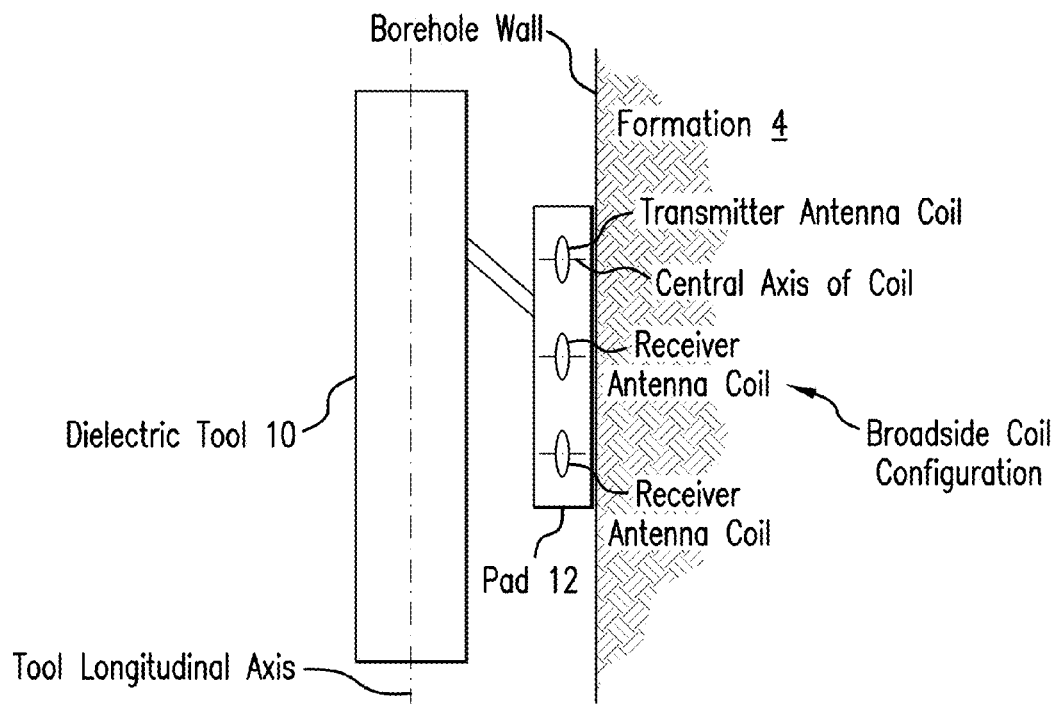
FIG. 3 depicts aspects of the transmitting and receiving antennas configured for broadside-firing.

The transmitter antenna 13 and the receiver antennas 14 and 15 may have different geometric orientations for different travel paths for the electromagnetic wave to travel through the formation. One example illustrated in FIG. 2 is referred to as "end-fire." In the end-fire configuration, the antennas are conductive coils where the central axis through each coil is in line with the central axes of the other coils where the central axes are generally parallel to the longitudinal axis of the tool 10. Another example illustrated in FIG. 3 is referred to as "broadside." In the broadside configuration, the antennas are conductive coils where the central axis through each coil is not in line with the central axes of the other coils and where the central axes are generally perpendicular to the longitudinal axis of the tool 10.

Figure 4:
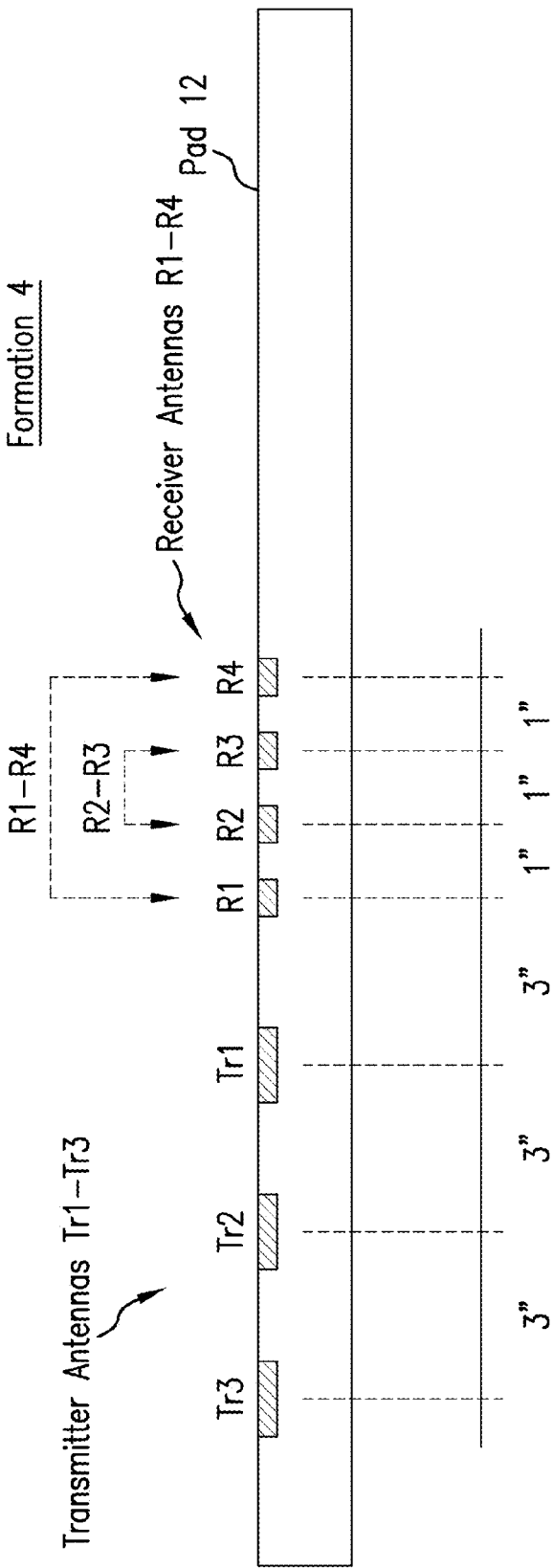
FIG. 4 depicts aspects of the transmitting and receiving antennas in one embodiment for end-firing.

One embodiment of the pad 12 having a plurality of transmitter antennas (Tr1-Tr3) and a plurality of receiver antennas (R1-R4) is illustrated in FIG. 4, which also illustrates the distances or spacings between the transmitter antennas and the receiver antennas. One example of an inversion method and associated equations for inverting measurements of the dielectric tool 10 is presented below using one selected transmitter antenna and a selected pair of receiver antennas in the geometry illustrated in FIG. 4 with an end-fire configuration. Accordingly, the transmitter antenna transmits an electromagnetic wave into the formation and the wave is sequentially received first by one receiver antenna and then another receiver antenna in order to measure the relative magnetic field magnitude and the relative phase at the two receiver antennas. In the examples of the method presented below, the resistivity of the formation is 0.3 ohm-meters, the relative permittivity of the formation is 40, and the configuration of the dielectric tool is as illustrated in FIG. 4.

Equation 1 relates the ratio of the z-component of the magnetic field measured at one selected receiver antenna (referred to as point 1) in the selected receiver antenna pair to the z-component of the magnetic field measured at the other receiver antenna (referred to as point 2) in the selected receiver antenna pair to $r_1$, $r_2$, and wave vector K.

$$\frac{H_{z1}}{H_{z2}} = \frac{r_2^2\left(1 - \frac{i}{Kr_1}\right)}{r_1^2\left(1 - \frac{i}{Kr_2}\right)} e^{-iK(r_1 - r_2)} \quad (1)$$

$$K = K_{real} + iK_{imag} \text{ where } i = \text{imaginary unit and } i^2 = -1 \quad (2)$$

$$K_{real} = \left(\frac{\mu\varepsilon\omega^2}{2}\right)^{0.5}(1 + X^{0.5})^{0.5} \quad (3)$$

where $\mu$=formation permeability, $\varepsilon$=formation permittivity, and $\omega$=angular velocity of the electromagnetic wave transmitter by the transmitter antenna.

$$K_{imag}\left(\frac{\mu\varepsilon\omega^2}{2}\right)^{0.5}(-1 + X^{0.5})^{0.5} \quad (4)$$

$$X = 1 = \frac{\sigma^2}{\varepsilon^2\omega^2} \text{ where } \sigma = \text{formation conductivity.} \quad (5)$$

Equation (1) can be written in logarithmic form to get equation 6.

$$X_{rel} = 20\log_{10}\left|\frac{H_{z1}}{H_{z2}}\right| \quad (6)$$

Using equation 6, the real portion of equation 1 may be written as equation 7 and the imaginary portion may be written as equation 8.

$$\frac{1}{20}X_{rel}\ln 10 = 2\ln\left(\frac{r_2}{r_1}\right) + 0.5\ln(c^2 + d^2) + K_{imag}(r_1 - r_2) \quad (7)$$

$$i \text{ angle}\left(\frac{H_{z1}}{H_{z2}}\right) + i2m\pi = i\text{Arctg}\left(\frac{d}{c}\right) + (-i)K_{real}(r_1 - r_2) \quad (8)$$

where $m$ is an integer including zero.

$$C = \frac{r_2}{r_1}\frac{r_1 r_2 K_{real}^2 + (K_{imag}r_2 - 1)(K_{imag}r_1 - 1)}{r_2^2 K_{real}^2 + (K_{imag}r_2 - 1)^2} \quad (9)$$

$$d = \frac{r_2}{r_1}\frac{K_{real}(r_1 - r_2)}{r_2^2 K_{real}^2 + (K_{imag}r_2 - 1)^2} \quad (10)$$

The norm of the magnitude error ($\|E_m\|$) may be written as equation 11. Equation 11 quantifies the difference between the magnitude of the ratio of the magnetic fields at points 1 and 2 as measured and the magnitude of the ratio of the magnetic fields at points 1 and 2 that would result from an estimated electrical characteristic (e.g., conductivity and/or permittivity) of the formation. Similarly, the norm of the phase error ($\|E_{ph}\|$) may be written as equation 12. Equation 12 quantifies the difference between the phase angle of the ratio of the magnetic fields at points 1 and 2 as measured and the magnitude of the ratio of the magnetic fields at points 1 and 2 that would result from an estimated electrical characteristic (e.g., conductivity and/or permittivity) of the formation.

$$\|E_m\|^2 = \left\|\frac{1}{20}X_{rel}\ln 10 - 2\ln\left(\frac{r_2}{r_1}\right) - 0.5\ln(c^2 + d^2) - K_{imag}(r_1 - r_2)\right\|^2 \quad (11)$$

$$\|E_{ph}\|^2 = \left\|\text{angle}\left(\frac{H_{z1}}{H_{z2}}\right) - \text{Arctg}\left(\frac{d}{c}\right) + K_{real}(r_1 - r_2)\right\|^2 \quad (12)$$

The error equations may be expressed as equation 13 where $\min_K$ represents a minimum, $\alpha_1$=a first weighting parameter, and $\alpha_2$=a second weighting parameter, the first and second weighting parameters being selected to normalize $E_m$ and $E_{ph}$ such that magnitudes of $E_m$ and $E_{ph}$ are within a selected range of each other. In one or more embodiments, the selected range is an order of magnitude or the magnitudes are the same.

$$\min_K \|E(K)\|^2 = \min_g(\alpha_1 \|E_m\|^2 + \alpha_2 \|E_{ph}\|^2) \quad (13)$$

Equation 14 provides an initial value for $K_{real}$ and equation 15 provides an initial value for $K_{imag}$ to be used as starting points for minimizing an error function such as equation 13 using an optimizing method or algorithm in order to converge on a minimum value.

$$K_{real_0} = \frac{1}{r_1 - r_2}\left(-\text{angle}\left(\frac{H_{z1}}{H_{z2}}\right) - m(2\pi)\right) \quad (14)$$

$$K_{imag_0} = \frac{-1}{r_1 - r_2}\left(-\frac{X_{rel}}{20}\ln(10) + 2\ln\left(\frac{r_2}{r_1}\right)\right) \quad (15)$$

Any optimization method or algorithm may be used to minimize the error function. Gradient based optimization methods may be preferred due to their faster rate of convergence to a solution. One such method is the steepest descent method in which the negative of the gradient vector of the objective function with respect to search parameter K (wave vector) is used at each step as the search direction for the next step. One example of the steps required for finding a point that minimizes function E(K) using this method are as follows:

1-Select the starting point $K_i$; i=0
2-Compute $\nabla E(K_i)$. If $\|\nabla E(K_i)\|$ is smaller than convergence limit stop otherwise go to next step.
3-Update the next point as $$K_{i+1} = K_i + \alpha\left(-\frac{\nabla E(K_i)}{\|\nabla E(K_i)\|}\right).$$

4-Find the step size $\alpha$ where $E)K_{i+1}$ is minimized.
5-Check if $\|E(K_{i+1}) - E(K_i)\|$ is less than convergence limit. If so, stop otherwise reiterate from step 2.

It is noted that the success of this method in obtaining the correct answer relies on starting points that are close enough to the global minimum to enable convergence at that point. Without initial starting points such as $K_{real_0}$ and $K_{imag_0}$ within the necessary range, any optimization method requires prohibitively many iterations to obtain the correct answer.

FIG. 5 presents relative values of measurements at the listed pairs of receiver antennas and corresponding transmitter antenna for use in illustrating the inversion method disclosed herein. FIG. 5A is the ratio of magnetic field magnitude at the listed antenna pairs and corresponding transmitter antenna for various electromagnetic wave frequencies. FIG. 5B is the relative phase angle of the magnetic field at one receiver antenna in the listed receiver antenna pair to the phase angle of the magnetic field at other receiver antenna in the listed receiver antenna pair. The resulting ratios provide relative measurement values. It can be seen that for the formation properties mentioned above (i.e., formation resistivity=0.3 ohm-meters and relative permittivity=40) and frequencies 450 MHz and 1000 MHZ the relative phase angle for receivers 3 and 6, 6 and 9, and 9 and 12 exceeds $2\pi$ radians and, thus, phase wrapping occurs at these frequencies. It is noted that prior art inversion methods are unable to solve the inverse problem for cases when the relative phase is greater than $2\pi$ radians. The phase wrapping occurs for instruments where transmitters and receivers are not synchronized.

Figure 6:
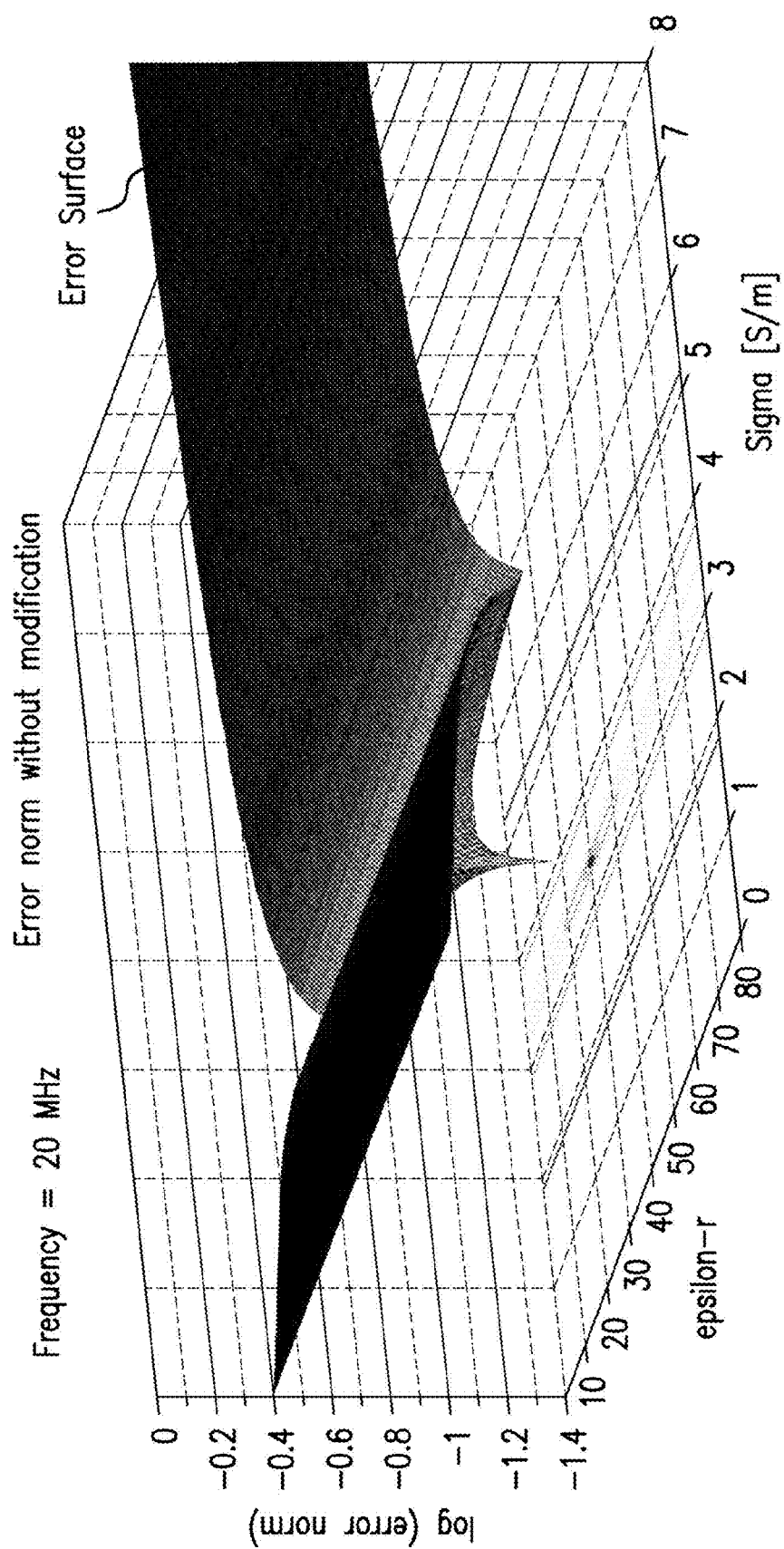
FIG. 6 is a three-dimensional graph of error versus conductivity and permittivity for measurement data that is not normalized and does not exhibit phase wrapping.

FIG. 6 is a three-dimensional graph of error versus conductivity and permittivity for measurement data that is not normalized and does not exhibit phase wrapping for the low frequency of 20 MHz. In this embodiment, error is defined as the weighted sum of the equations 11 and 12. A low resistivity formation with conductivity of 3.33 S/m and relative permittivity of 40 is assumed. From FIG. 5, it is seen that phase wrapping does not occur at 20 MHz for the receiver antenna pairs and transmitter antennas listed. The data plotted in FIG. 6 was obtained from the above equations without normalizing the data (i.e., $\alpha_1 = \alpha_2 = 1$ in equation 13). It can be seen that this is a well-defined inverse problem.

Figure 7:
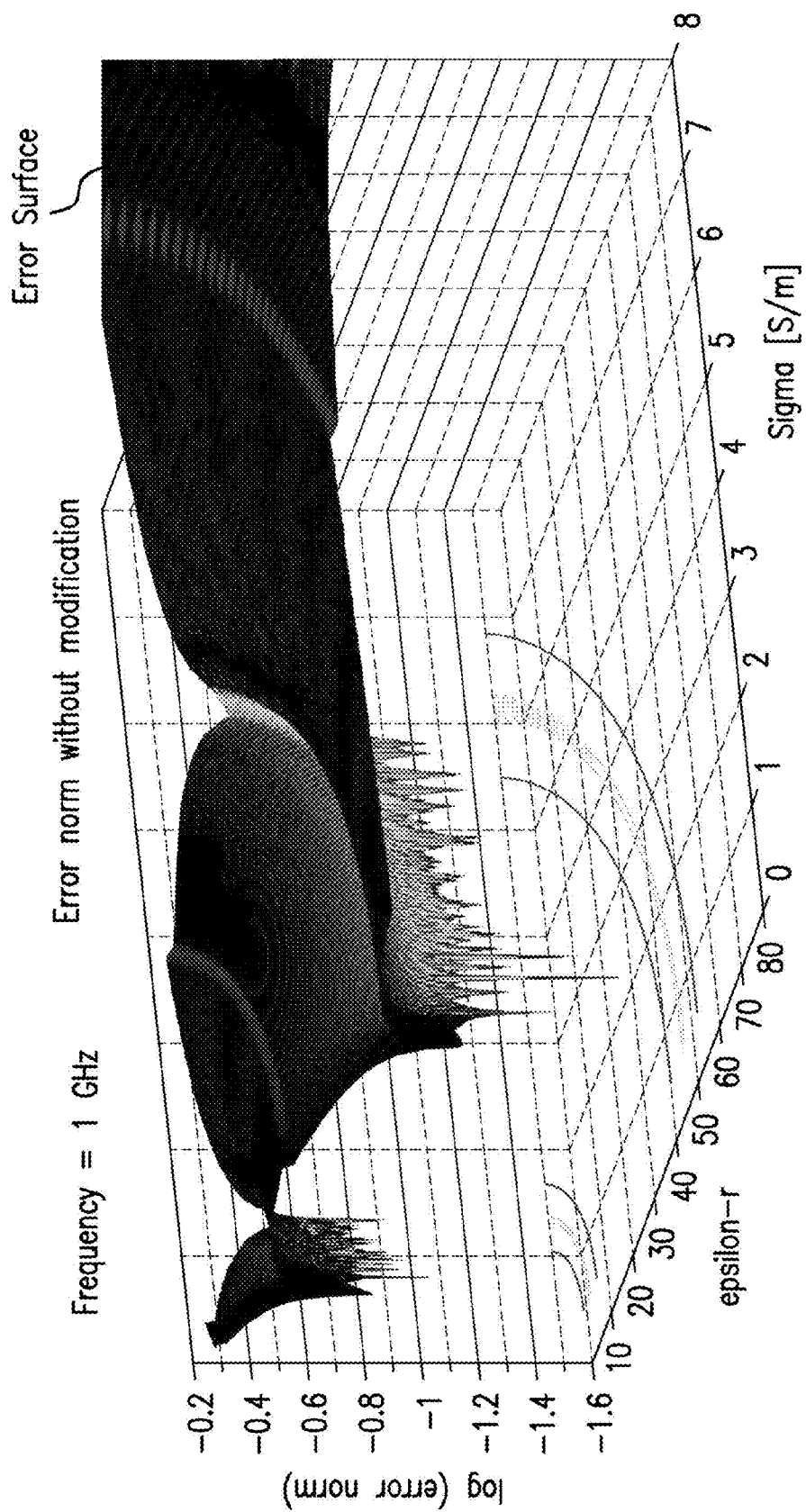
FIG. 7 is a three-dimensional graph of error versus conductivity and permittivity for measurement data that is not normalized and does exhibit phase wrapping.

FIG. 7 is a three-dimensional graph of error versus conductivity and permittivity for measurement data that is not normalized and does exhibit phase wrapping for the high frequency of 1 GHz. Due to the many downward extending peaks from the error surface, this is a highly ill-posed problem.

Figure 8:
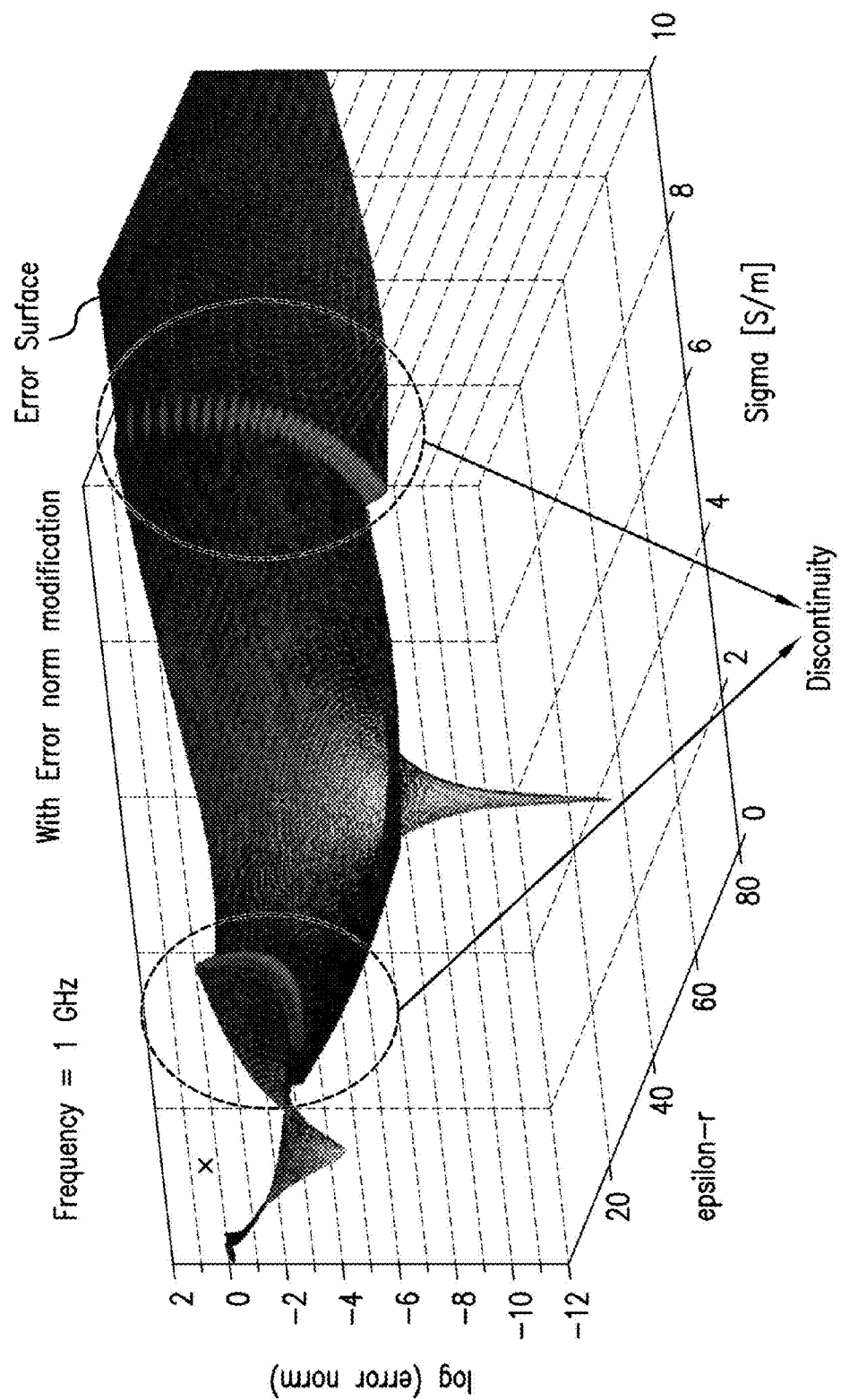
FIG. 8 is a three-dimensional graph of error versus conductivity and permittivity for measurement data that is normalized and does exhibit phase wrapping.

FIG. 8 is a three-dimensional graph of error versus conductivity and permittivity for measurement data that is normalized and does exhibit phase wrapping. In this figure, it can be seen that by normalizing the data, many of the downward extending peaks have bee removed. The problem is still ill-posed, but by using multiple starting points (i.e., $K_{real_0}$ and $K_{imag_0}$ with multiple m integer values) the problem can be solved.

Figure 9:
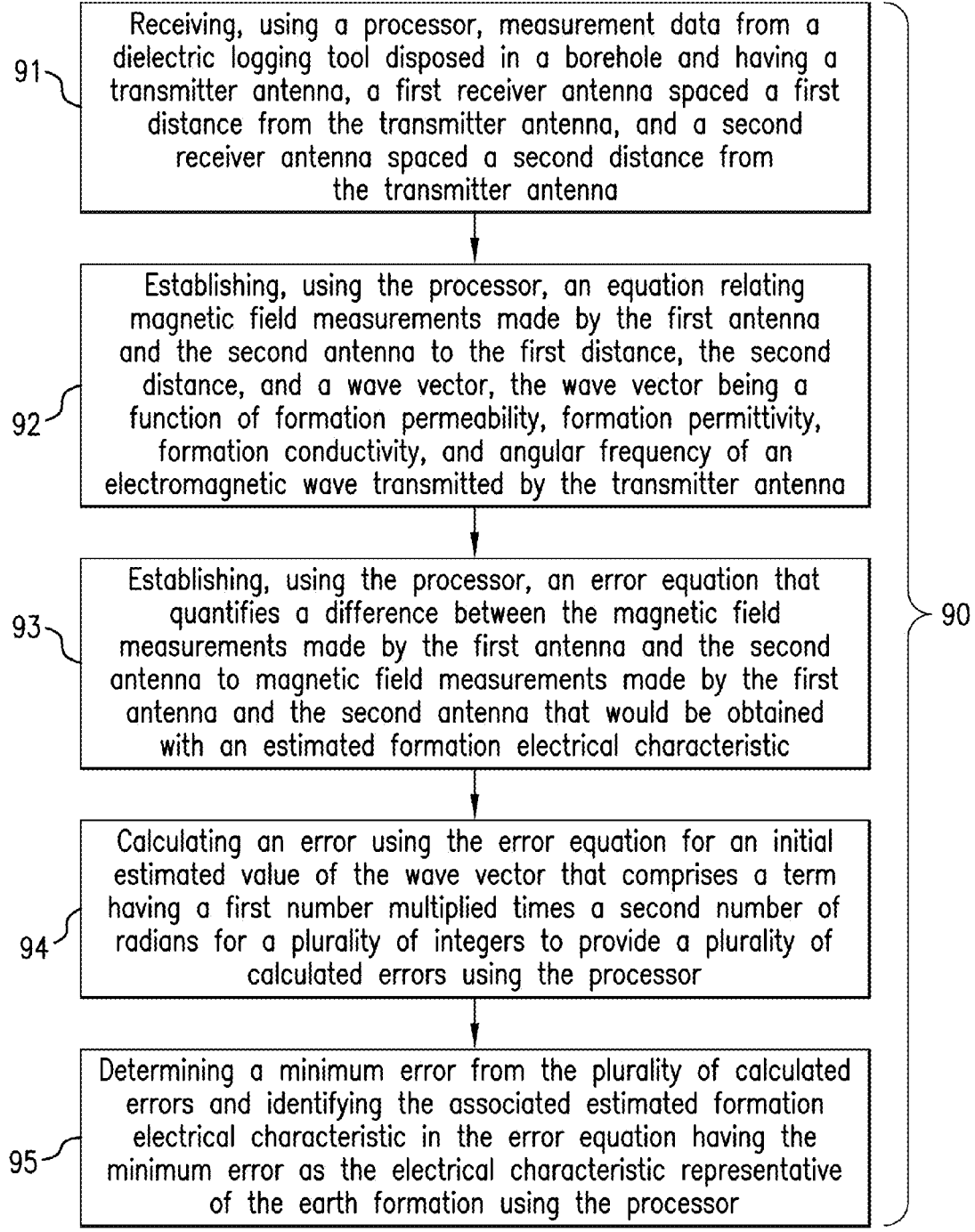
FIG. 9 is flow chart for a method for inverting measurement data obtained from a downhole tool.

FIG. 9 is a flow chart for a method 90 for inverting measurement data obtained from a dielectric logging tool to estimate an electrical characteristic representative of an earth formation penetrated by a borehole. The electrical characteristic may be formation conductivity, formation permittivity or both, as examples. Block 91 calls for receiving, using a processor, measurement data from a dielectric logging tool disposed in the borehole and having a transmitter antenna, a first receiver antenna spaced a first distance from the transmitter antenna, and a second receiver antenna spaced a second distance from the transmitter antenna. The transmitter antenna may include one or more transmitter antennas and each of the first and second receiver antennas may include one or more receiver antennas. In one or more embodiments, the dielectric logging tool may have the configuration depicted in FIG. 4. Block 92 calls for establishing, using the processor, an equation relating magnetic field measurements made by the first antenna and the second antenna to the first distance, the second distance, and a wave vector, the wave vector being a function of formation permeability, formation permittivity, formation conductivity, and angular frequency of an electromagnetic wave transmitted by the transmitter antenna. In one or more embodiments, the magnetic field measurements are made relative to each other. In one or more embodiments, the magnetic field measurements are represented as (1) a ratio of the magnetic field magnitude measured at the first antenna to the magnetic field magnitude measured at the second antenna and (2) a relative value of the magnetic field phase angle measured at the first antenna to the magnetic field phase angle measured at the second antenna. A non-limiting example of the equation may be represented by equations 1-10. Block 93 calls for establishing, using the processor, an error equation that quantifies a difference between the magnetic field measurements made by the first antenna and the second antenna to magnetic field measurements made by the first antenna and the second antenna that would be obtained with an estimated formation electrical characteristic. A non-limiting example of the error equation may be represented by equations 11 and 12. Equation 13 may further be used as a non-limiting example of the error equation. Block 94 calls for calculating an error using the error equation for an initial estimated value of the wave vector that includes a term having a first number multiplied times a second number of radians for a plurality of integers to provide a plurality of calculated errors using the processor. In one or more embodiments, the first number is an integer including zero and the second number is two-pi to give two-pi radians. A non-limiting example of the initial estimated value may be obtained using equations 14 and 15. Block 95 calls for determining a minimum error from the plurality of calculated errors and identifying the associated estimated formation electrical characteristic in the error equation having the minimum error as the electrical characteristic representative of the earth formation.

The method 90 may also include using an optimization algorithm that converges on a minimum error value for each selected integer in the initial estimated value of the wave vector for block 94.

The method 90 may also include estimating a property of the earth formation using the electrical characteristic. An example of the property is saturation of the formation, the saturation being a relative amount of water, oil and gas in pores of the formation. Another property may be location of boundaries between formation layers having different electrical characteristics. This can be determined from acquired tool data as a function of measured depth. In order to estimate a property, the method 90 may include conveying a carrier through a borehole penetrating an earth formation. Further, the method 90 may include transmitting an electromagnetic wave into the earth formation using a transmitter antenna disposed on the carrier. Further, the method 90 may include measuring a first magnetic field using a first receiver antenna spaced a first distance from the transmitter antenna, the first magnetic field being due to receiving at the first receiver antenna the transmitted electromagnetic wave that has traversed the earth formation. Further, the method 90 may include measuring a second magnetic field using a second receiver antenna spaced a second distance from the transmitter antenna, the second magnetic field being due to receiving at the second receiver antenna the transmitted electromagnetic wave that has traversed the earth formation.

While the embodiment presented used the end-fire configuration, it can be appreciated that the method disclosed herein is also applicable to the broadside configuration or a combination of both configurations.

It can be appreciated that a specific dielectric tool 10 in conjunction with the inversion method disclosed herein can be calibrated to provide accurate formation electrical characteristic values and/or formation property values using analysis or laboratory or field calibration using formation samples or formations having known electrical characteristics or properties.

In support of the teachings herein, various analysis components may be used, including a digital and/or an analog system. For example, the downhole electronics 9 and/or the computer processing system 11 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements. The term "configured" relates to a structural limitation of an apparatus that allows the apparatus to perform the task or function for which the apparatus is configured.

The teachings illustratively disclosed herein suitably may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for inverting measurement data obtained from a dielectric logging tool to estimate an electrical characteristic representative of an earth formation penetrated by a borehole, the method comprising:
   receiving, using a processor, measurement data from a dielectric logging tool disposed in the borehole and comprising a transmitter antenna, a first receiver antenna spaced a first distance from the transmitter antenna, and a second receiver antenna spaced a second distance from the transmitter antenna;
   establishing, using the processor, an equation relating magnetic field measurements made by the first antenna and the second antenna to the first distance, the second distance, and a wave vector, the wave vector being a function of formation permeability, formation permittivity, formation conductivity, and angular frequency of an electromagnetic wave transmitted by the transmitter antenna;
   establishing, using the processor, an error equation that quantifies a difference between the magnetic field measurements made by the first antenna and the second antenna to magnetic field measurements made by the first antenna and the second antenna that would be obtained with an estimated formation electrical characteristic;
   calculating an error associated with phase wrapping using the error equation for an initial estimated value of the wave vector that comprises a term having a first number multiplied times a second number of radians for a plurality of first numbers to provide a plurality of calculated errors using the processor; and
   determining a minimum error from the plurality of calculated errors and identifying the associated estimated formation electrical characteristic in the error equation having the minimum error as the electrical characteristic representative of the earth formation using the processor.

2. The method according to claim 1, wherein the first number is an integer and the second number is two-pi.

3. The method according to claim 1, wherein calculating comprises using an optimization algorithm that converges on a minimum error value for each selected integer in the initial estimated value of the wave vector.

4. The method according to claim 1, wherein the equation relating the first and second magnetic fields as measured comprises the following equation:

$$\frac{H_{z1}}{H_{z2}} = \frac{r_2^2\left(1 - \frac{i}{Kr_1}\right)}{r_1^2\left(1 - \frac{i}{Kr_2}\right)} e^{-iK(r_1 - r_2)}$$

where: K is the wave vector $K = K_{real} + iK_{imag}$;

$$K_{real}\left(\frac{\mu\varepsilon\omega^2}{2}\right)^{0.5}(1 + X^{0.5})^{0.5};$$

$$K_{imag}\left(\frac{\mu\varepsilon\omega^2}{2}\right)^{0.5}(-1 + X^{0.5})^{0.5};$$

$$X = 1 + \frac{\sigma^2}{\varepsilon^2\omega^2};$$

$H_{Z1}$=magnetic field magnitude of Z-component at the first receiver antenna in X-Y-Z coordinate system;
$H_{Z2}$=magnetic field magnitude of Z-component at the second receiver antenna;
i=imaginary unit, $i^2 = -1$;
$r_1$=first distance;
$r_2$=second distance;
$\mu$=formation permeability;
$\varepsilon$=formation permittivity;
$\sigma$=formation conductivity; and
$\omega$=angular velocity of the electromagnetic wave transmitted by the transmitter antenna.

5. The method according to claim 4, wherein the error equation comprises:

$$\|E_m\|^2 = \left\|\frac{1}{20}X_{rel}\ln 10 - 2\ln\left(\frac{r_2}{r_1}\right) - 0.5\ln(c^2 + d^2) - K_{imag}(r_1 - r_2)\right\|^2$$

and $$\|E_{ph}\|^2 = \left\|\text{angle}\left(\frac{H_{z1}}{H_{z2}}\right) - \text{Arctg}\left(\frac{d}{c}\right) + K_{real}(r_1 - r_2)\right\|^2$$

where:

$$X_{rel} = 20\log_{10}\left|\frac{H_{z1}}{H_{z2}}\right|;$$

$$\frac{1}{20}X_{rel}\ln 10 = 2\ln\left(\frac{r_2}{r_1}\right) + 0.5\ln(c^2 + d^2) + K_{imag}(r_1 - r_2);$$

$$i \text{ angle}\left(\frac{H_{z1}}{H_{z2}}\right) + i2m\pi = i\text{Arctg}\left(\frac{d}{c}\right) + (-i)K_{real}(r_1 - r_2);$$

m=an integer including zero;

$$c = \frac{r_2}{r_1}\frac{r_1 r_2 K_{real}^2 + (K_{imag}r_2 - 1)(K_{imag}r_1 - 1)}{r_2^2 K_{real}^2 + (K_{imag}r_2 - 1)^2};$$

$$d = \frac{r_2}{r_1}\frac{K_{real}(r_1 - r_2)}{r_2^2 K_{real}^2 + (K_{imag}r_2 - 1)^2};$$

Arctg=Arctangent; and
$\|X\|$=norm of X.

6. The method according to claim 5, wherein the error equation further comprises:

$$\min_K\|E(K)\|^2 = \min_K(\alpha_1\|E_m\|^2 + \alpha_2\|E_{ph}\|^2),$$

where $\min_K$ represents a minimum;
$\alpha_1$=a first weighting parameter;
$\alpha_2$=a second weighting parameter, the first and second weighting parameters being selected to normalize $E_m$ and $E_{ph}$ such that $\alpha_1 E_m$ and $\alpha_2 E_{ph}$ are within a selected range of each other.

7. The method according to claim 6, wherein the selected range comprises an order of magnitude.

8. The method according to claim 7, wherein the first weighting parameter and the second weighting parameter are selected such that $\alpha_1 E_m$ and $\alpha_2 E_{ph}$ are equal to each other.

9. The method according to claim 5, wherein calculating comprises using the following equations as the initial estimated value of the wave vector:

$$K_{real_0} = \frac{1}{r_1 - r_2}\left(-\text{angle}\left(\frac{H_{z1}}{H_{z2}}\right) - m(2\pi)\right); \text{ and}$$

$$K_{imag_0} = \frac{-1}{r_1 - r_2}\left(-\frac{X_{rel}}{20}\ln(10) + 2\ln\left(\frac{r_2}{r_1}\right)\right);$$

where m=an integer including zero.

10. The method according to claim 9, wherein m ranges from −10 to +10.

11. The method according to claim 1, wherein the electrical characteristic comprises formation conductivity, formation permittivity, or both.

12. A method for estimating a property of an earth formation, the method comprising:
conveying a carrier through a borehole penetrating an earth formation;
transmitting an electromagnetic wave into the earth formation using a transmitter antenna disposed on the carrier;
measuring a first magnetic field using a first receiver antenna spaced a first distance from the transmitter antenna, the first magnetic field being due to receiving at the first receiver antenna the transmitted electromagnetic wave as modified by the earth formation;
measuring a second magnetic field using a second receiver antenna spaced a second distance from the transmitter antenna, the second magnetic field being due to receiving at the second receiver antenna the transmitted electromagnetic wave as modified by the earth formation;
establishing, using a processor, an equation relating a ratio of the first magnetic field to the second magnetic field to the first distance, the second distance, and a wave vector, the wave vector being a function of formation permeability, formation permittivity, formation conductivity, and angular frequency of an electromagnetic wave transmitted by the transmitter antenna;
establishing, using the processor, an error equation that quantifies a difference between the ratio of the first and second magnetic fields as measured to a ratio of the first and second magnetic fields that would be obtained with an estimated formation electrical characteristic;
calculating an error associated with phase wrapping using the error equation for an initial estimated value of the wave vector that comprises a term having an integer multiplied times two-pi radians for a plurality of integers to provide a plurality of calculated errors using the processor; and
determining a minimum error from the plurality of errors and the associated estimated formation electrical characteristic in the error equation having the minimum error using the processor; and
estimating, using the processor, the formation property using the associated estimated formation electrical characteristic in the error equation having the minimum error.

13. The method according to claim 12, wherein the formation electrical characteristic comprises conductivity, permittivity, or both.

14. The method according to claim 12, wherein the formation property comprises saturation of the formation, the saturation being a relative amount of water, oil and gas in pores of the formation.

15. An apparatus for estimating an electrical characteristic representative of an earth formation, the apparatus comprising:
a carrier configured to be conveyed through a borehole penetrating the formation;
a transmitter antenna disposed on the carrier and configured to transmit an electromagnetic wave into the formation;
a first receiver antenna spaced a first distance from the transmitter and configured to receive the electromagnetic wave from the formation and measure a first magnetic field at the first receiver antenna;
a second receiver antenna spaced a second distance from the transmitter and configured to receive the electromagnetic from the formation and measure a second magnetic field at the second receiver antenna; and
a processor configured to:
receive the magnetic field measurements obtained at the first and second receiver antennas;
establish an equation relating a ratio of the measure first magnetic field to the measured second magnetic field to the first distance, the second distance, and a wave vector, the wave vector being a function of formation permeability, formation permittivity, formation conductivity, and angular frequency of an electromagnetic wave transmitted by the transmitter antenna;
establish an error equation that quantifies a difference between the ratio of the first and second magnetic fields as measured to a ratio of the first and second magnetic fields that would be obtained with an estimated formation electrical characteristic;
calculate an error associated with phase wrapping using the error equation for an initial estimated value of the wave vector that comprises a term having an integer multiplied times two-pi radians for a plurality of integers to provide a plurality of calculated errors; and
determine a minimum error from the plurality of errors and identify the associated estimated formation electrical characteristic in the error equation having the minimum error as the electrical characteristic representative of the earth formation.

16. The apparatus according to claim 15, wherein the processor is further configured to estimate a formation property using the associated estimated formation electrical characteristic in the error equation having the minimum error.

17. The apparatus according to claim 15, wherein the transmitter antenna, the first receiver antenna, and the second receiver antenna are configured as coils in an end-fire configuration in which central axes of the coils are parallel to each other and have a vector component parallel to a longitudinal axis of the carrier.

18. The apparatus according to claim 17, wherein the central axes are in alignment with each other.

* * * * *